United States Patent
Mizuura et al.

(10) Patent No.: US 11,426,783 B2
(45) Date of Patent: Aug. 30, 2022

(54) WORKPIECE CHANGER, WORKPIECE CONVEYOR DEVICE, PROCESSING DEVICE, METHOD FOR MANUFACTURING RING BEARING, METHOD FOR MANUFACTURING MACHINE, AND METHOD FOR MANUFACTURING VEHICLE

(71) Applicant: NSK LTD., Tokyo (JP)

(72) Inventors: Kengou Mizuura, Fujisawa (JP);
Masatoshi Shimoda, Fujisawa (JP);
Yoshihiko Otaki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/427,987

(22) PCT Filed: Oct. 11, 2019

(86) PCT No.: PCT/JP2019/040254
§ 371 (c)(1),
(2) Date: Aug. 3, 2021

(87) PCT Pub. No.: WO2020/183768
PCT Pub. Date: Sep. 17, 2020

(65) Prior Publication Data
US 2022/0126352 A1    Apr. 28, 2022

(30) Foreign Application Priority Data

Mar. 12, 2019  (JP) .............................. JP2019-044821

(51) Int. Cl.
*B21D 43/02* (2006.01)
*B21D 53/10* (2006.01)

(52) U.S. Cl.
CPC ............. *B21D 43/02* (2013.01); *B21D 53/10* (2013.01)

(58) Field of Classification Search
CPC .................................. B21D 43/02; B21D 53/10
See application file for complete search history.

(56) References Cited

U.S. PATENT DOCUMENTS 4,836,101 A * 6/1989 Kato ....................... B30B 15/30
                                                  100/215
5,058,415 A * 10/1991 Blase ...................... B21D 53/10
                                                  29/725

(Continued)

FOREIGN PATENT DOCUMENTS

DE      2631131 A1   3/1977
DE      10055965 C1  2/2002

(Continued)

OTHER PUBLICATIONS

International Search Report (PCT/ISA/210) dated Nov. 19, 2019 in corresponding International Application No. PCT/JP2019/040254.

(Continued)

*Primary Examiner* — Rick K Chang
(74) *Attorney, Agent, or Firm* — Sughrue Mion, PLLC

(57) ABSTRACT

While the loading member supporting mechanism moves the loading member from the workpiece set state to the workpiece retracted state and returns to the workpiece set state again, the displacement drive unit and the rotation drive unit perform an operation of disposing the workpiece holding portion arranged at the processing position to the replacement position and an operation of disposing the workpiece holding portion disposed at the replacement position to the processing position in a trajectory in which the loading member does not interfere with the shoe.

16 Claims, 12 Drawing Sheets

(56) References Cited

U.S. PATENT DOCUMENTS

| | | | |
|---|---|---|---|
| 5,151,008 A * | 9/1992 | Ishida | B25J 9/0084 |
| | | | 414/744.5 |
| 5,161,332 A | 11/1992 | Koch | |
| 6,299,404 B1 * | 10/2001 | Muka | H01L 21/67781 |
| | | | 414/935 |
| 7,736,118 B2 * | 6/2010 | Uratani | H01L 21/67742 |
| | | | 901/17 |
| 8,307,685 B2 * | 11/2012 | Heinz | B21D 7/08 |
| | | | 72/168 |
| 2003/0180126 A1 * | 9/2003 | Poole | H01L 21/67742 |
| | | | 414/217 |
| 2007/0269302 A1 * | 11/2007 | Kim | H01L 21/68707 |
| | | | 414/744.1 |
| 2011/0260386 A1 | 10/2011 | Wilfred | |
| 2012/0232690 A1 * | 9/2012 | Gilchrist | B25J 11/0095 |
| | | | 700/228 |

FOREIGN PATENT DOCUMENTS

| JP | 46-17268 Y1 | 6/1971 |
|---|---|---|
| JP | 63-124402 U | 8/1988 |
| JP | 3-196936 A | 8/1991 |
| JP | 4-82603 A | 3/1992 |
| JP | 11-320352 A | 11/1999 |
| JP | 2002-346873 A | 12/2002 |
| JP | 3926583 B2 | 6/2007 |
| JP | 5125129 B2 | 1/2013 |
| JP | 5321123 B2 | 10/2013 |
| JP | 5592391 B2 | 9/2014 |
| JP | 6312473 B2 | 4/2018 |

OTHER PUBLICATIONS

Written Opinion (PCT/ISA/237) dated Nov. 19, 2019 in corresponding International Application No. PCT/JP2019/040254.
Communication dated May 10, 2022 by the European Patent Office in corresponding European Application No. 19919438.2.

* cited by examiner

WORKPIECE CHANGER, WORKPIECE CONVEYOR DEVICE, PROCESSING DEVICE, METHOD FOR MANUFACTURING RING BEARING, METHOD FOR MANUFACTURING MACHINE, AND METHOD FOR MANUFACTURING VEHICLE

CROSS-REFERENCE TO RELATED APPLICATIONS

This application is a National Stage of International Application No. PCT/JP2019/040254 filed Oct. 11, 2019, claiming priority based on Japanese Patent Application No. 2019-044821, filed Mar. 12, 2019, the contents of all of which are incorporated herein by reference in their entirety.

TECHNICAL FIELD

The present invention relates to a workpiece changer, a workpiece conveyance device, a processing device, a manufacturing method for a ring bearing, a manufacturing method for a machine, and a manufacturing method for a vehicle.

BACKGROUND

In a processing device that performs grinding or the like on a ring-shaped workpiece, the workpiece conveyed by a workpiece conveyance path is disposed at a processing position, and predetermined processing is performed to the workpiece at the processing position.

Then, the processed workpiece is taken out from the processing position and returned to the workpiece conveyance path, and the workpiece is sent to a subsequent step.

A workpiece changer or a loading device is widely used as a mechanism that conveys the workpiece to such a processing position (for example, Patent Literatures 1 to 4).

In a workpiece changer disclosed in Patent Literature 1, holding portions capable of respectively holding a workpiece and a processed product are provided at both end portions of a swing arm. The workpiece held by one holding portion is conveyed from a vicinity of a supply and discharge position to a vicinity of a processing position by intermittently rotating the swing arm about a horizontal rotation shaft.

At the same time, the processed product held by the other holding portion is conveyed from the vicinity of the processing position to the vicinity of the supply and discharge position.

Patent Literature 2 discloses a loading device including a planetary gear device having a planetary gear capable of planetary motion.

When the planetary gear performs the planetary motion, an eccentric coupling portion, which is provided on the planetary gear eccentrically with respect to a rotation center and is coupled to a rotation member and a loader member, performs motion along a cycloidal curve.

Thereby, the rotation member is rotated and the loader member is operated in a radial direction, and a workpiece is replaced with respect to a fixed shoe.

Patent Literature 3 discloses a loading device including a loader unit by which a workpiece is supplied at a workpiece supply position, the workpiece is ground at a workpiece grinding position, and the ground workpiece is discharge to outside at a workpiece discharge position.

In the loading device, a workpiece holding mechanism is positioned at each position at the same timing.

Patent Literature 4 discloses a loading device including a rotatable holder having workpiece support arms extending in opposite directions, and a workpiece holding arm that rotates coaxially with the holder.

In this loading device, a processed workpiece supported by a fixed shoe is clamped by one workpiece support arm of the holder and the workpiece holding arm, and then the processed workpiece is taken out by rotating the holder and the workpiece holding arm together.

CITATION LIST

Patent Literature

Patent Literature 1: JP-B-5321123
Patent Literature 2: JP-B-3926583
Patent Literature 3: JP-B-6312473
Patent Literature 4: JP-A-H3-196936

SUMMARY OF INVENTION

Technical Problem

In a processing device for mass-produced workpieces, loading time required for replacing a workpiece needs to be shortened due to a demand for improvement in productivity.

However, there is a limit to shortening the loading time in the above-described workpiece changer or loading device that continuously performs a plurality of operations, such as a workpiece unloading operation, a workpiece arrangement operation and a workpiece loading operation.

In addition, a structure of the loading device, arrangement of components, and the like have to be changed for a processing content-change or a setup-change, resulting in poor versatility.

Moreover, a plurality of components has to be replaced according to a shape of the workpiece to be processed, and a long time is required for the setup-change work.

In view of such circumstances, as a loading device provided for a vertical grinding machine, a rectilinear motion by a ball screw and a servomotor may be converted into movement along a path following a cam-shaped groove to perform a workpiece replacement operation at high speed.

However, even in this loading device, a movement direction of a workpiece is limited since the workpiece is moved along a groove shape in the structure.
Therefore, the setup-change work, such as changing the shape of the workpiece, remains complicated.

An object of the present invention is to provide a workpiece changer, a workpiece conveyance device and a processing device capable of replacing a workpiece at high speed, improving versatility, and reducing time and effort for a setup-change, and a manufacturing method for a ring bearing, a manufacturing method for a machine, and a manufacturing method for a vehicle.

Solution to Problem

The present invention is configured as follows.
(1) A workpiece changer configured to replace a ring-shaped workpiece between a replacement position of the workpiece and a processing position for processing the workpiece, the workpiece changer comprising:
a loading member rotatably supported about a rotation shaft, the loading member provided with workpiece holding portions configured to hold the workpiece at at least two radially outer edge portions;

a loading member supporting mechanism configured to movably support the loading member in a plane perpendicular to an axial direction of the rotation shaft; a rotation drive unit configured to rotationally drive the loading member about the rotation shaft; and a displacement drive unit configured to drive and displace the loading member supporting mechanism between a workpiece set state in which the workpiece holding portions are respectively disposed at the replacement position and the processing position and a workpiece retracted state in which the workpiece holding portions are disposed away from the replacement position and the processing position, wherein a shoe configured to support an outer circumference of the workpiece is disposed at the processing position, wherein while the loading member supporting mechanism moves the loading member from the workpiece set state to the workpiece retracted state and returns to the workpiece set state again, the displacement drive unit and the rotation drive unit perform an operation of disposing the workpiece holding portion arranged at the processing position to the replacement position and an operation of disposing the workpiece holding portion disposed at the replacement position to the processing position in a trajectory in which the loading member does not interfere with the shoe.

(2) A workpiece conveyance device comprises: the workpiece changer according to (1); and a workpiece conveyance unit including a workpiece supply position where the unprocessed workpiece is continuously supplied and a workpiece reception position where the processed workpiece is placed, the work conveyance unit configured to convey the workpiece.

The pick-and-place mechanism has a function of alternately performing:

a loading operation in which the unprocessed workpiece is transferred from the workpiece supply position to the workpiece holding portion disposed at the replacement position of the loading member; and an unloading operation in which the processed workpiece held by the workpiece holding portion at the replacement position of the loading member is transferred to the workpiece reception position.

(3) A processing device configured to process the workpiece, the processing device comprises the workpiece changer according to (1).

(4) A manufacturing method for a ring bearing, wherein the manufacturing method is for manufacturing a ring bearing by using the processing device according to (3).

(5) A manufacturing method for a machine, wherein the manufacturing method is for manufacturing a machine by using the processing device according to (3).

(6) A manufacturing method for a vehicle, wherein the manufacturing method is for manufacturing a vehicle by using the processing device according to (3).

Advantageous Effects of Invention

According to the present invention, the workpiece can be replaced at high speed, and the versatility can be improved, and the time and effort for the setup-change can be reduced.

DESCRIPTION OF EMBODIMENTS

Hereinafter, embodiments of the present invention will be described in detail with reference to the drawings.

Here, a case where an outer ring of a rolling bearing is used as a workpiece will be described as an example, but the present invention is not limited thereto.

(Workpiece)

Figure 1:
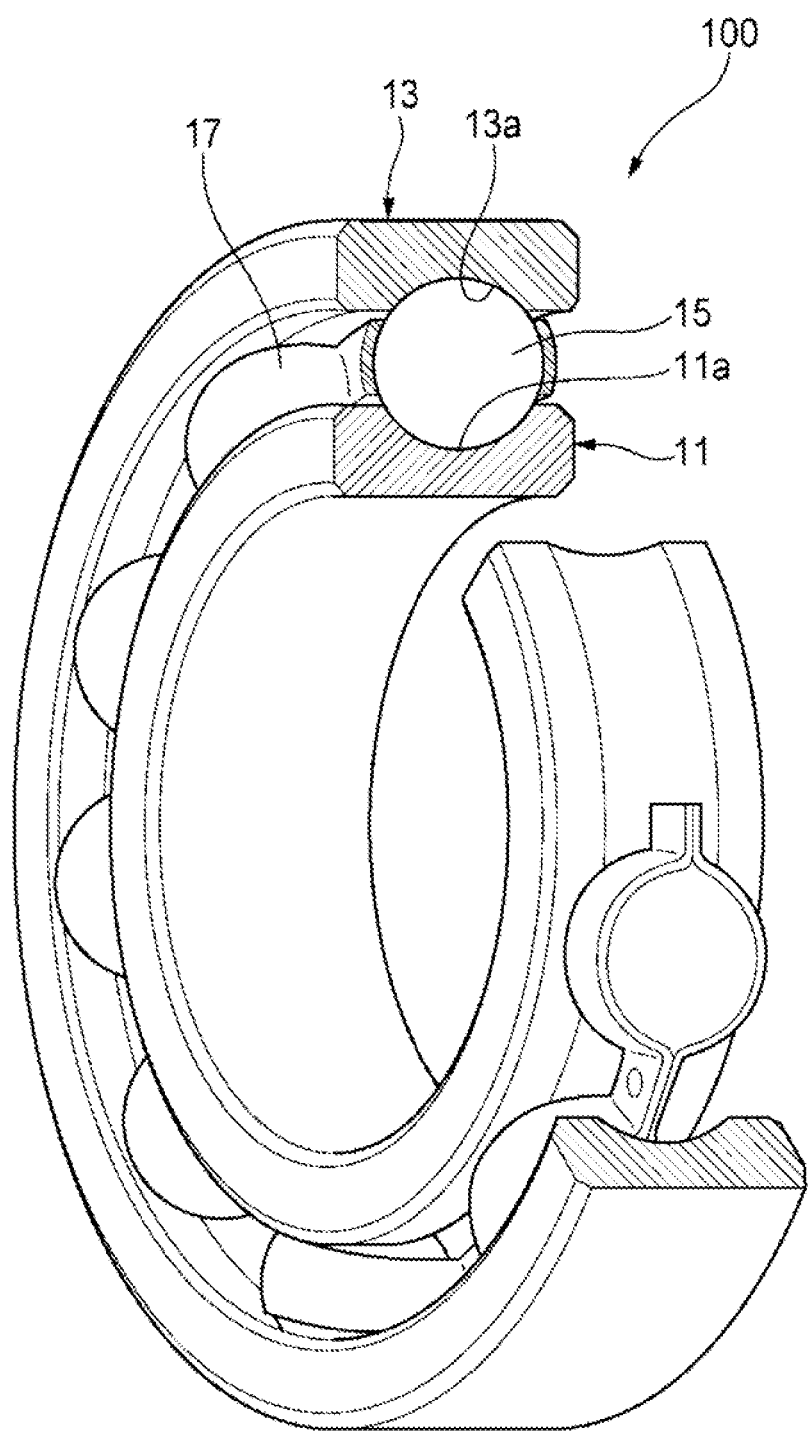
FIG. 1 is a partially cross-sectional perspective view of a rolling bearing.

FIG. 1 is a partially cross-sectional perspective view of the rolling bearing.

A rolling bearing (hereinafter, simply referred as a "bearing") 100 includes an inner ring 11, an outer ring 13, a plurality of rolling elements 15 provided between the inner ring 11 and the outer ring 13, and a cage 17 configured to rotatably hold the rolling elements 15.

The inner ring 11 is an annular body made of metal such as steel and having a raceway groove (a guide surface) 11a for the rolling elements 15 on an outer circumferential surface.

The outer ring 13 is an annular body made of metal such as steel and having a raceway groove (a guide surface) 13a for the rolling elements 15 on an inner circumferential surface.

(Workpiece Conveyance Device)

First Example

Figure 2:
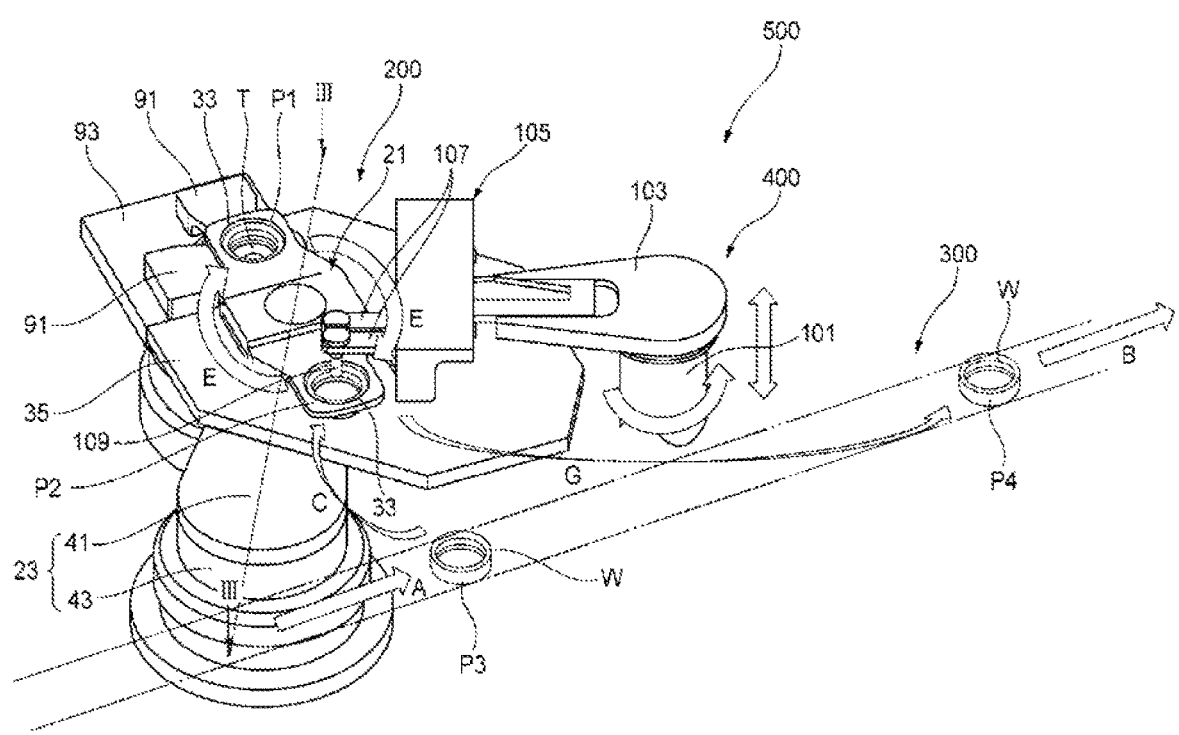
FIG. 2 is a perspective view of a workpiece conveyance device including a workpiece changer according to a first example.

FIG. 2 is a perspective view of a workpiece conveyance device including a workpiece changer according to a first example.

Figure 3:
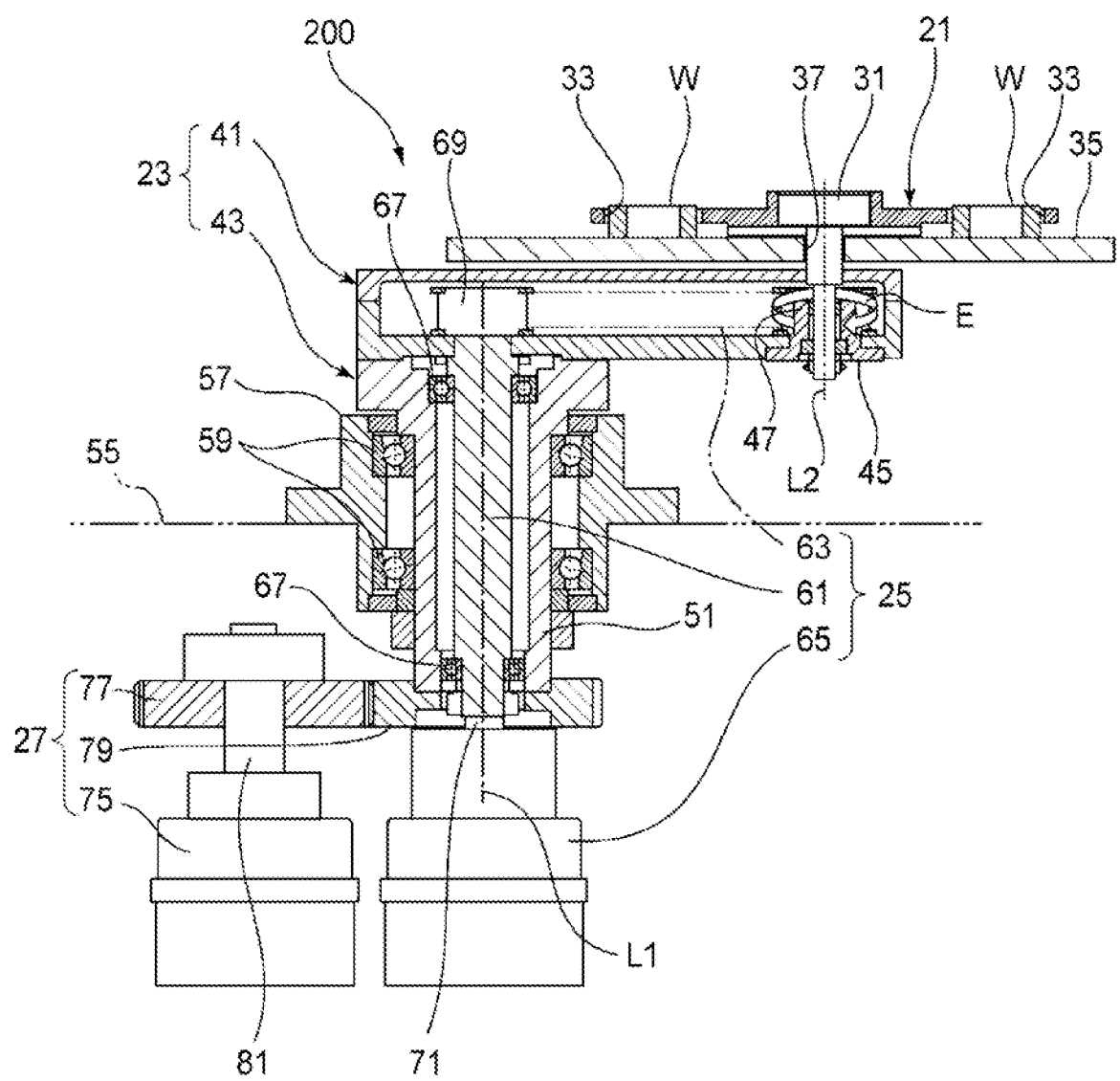
FIG. 3 is a cross-sectional view showing a cross section of the workpiece changer shown in FIG. 2 taken along the line III-III.

FIG. 3 is a cross-sectional view showing a cross section of the workpiece changer shown in FIG. 2 taken along the line III-III.

A workpiece W exemplified here is the outer ring 13 having the annular body shown in FIG. 1.

As shown in FIG. 2, a workpiece changer 200 according to this example, a workpiece conveyance unit 300 configured to convey the workpiece W, and a pick-and-place mechanism 400 configured to transfer the workpiece W to a processing position constitute a workpiece conveyance device 500.

In the workpiece conveyance device 500, the pick-and-place mechanism 400 transfers the unprocessed workpiece W, which is supplied from a previous step by the workpiece conveyance unit 300, to a processing position P1 of an vertical processing device (not shown). Then, the workpiece conveyance device 500 discharges the workpiece W, which is processed by the processing device, from the processing device, and the workpiece conveyance device 500 returns the processed workpiece W to the workpiece conveyance unit 300, and the workpiece conveyance unit 300 conveys the processed workpiece W to a next step.

(Workpiece Changer)

As shown in FIG. 3, the workpiece changer 200 includes a loading member 21, a loading member supporting mechanism 23, a rotation drive unit 25 and a displacement drive unit 27.

Figure 4:
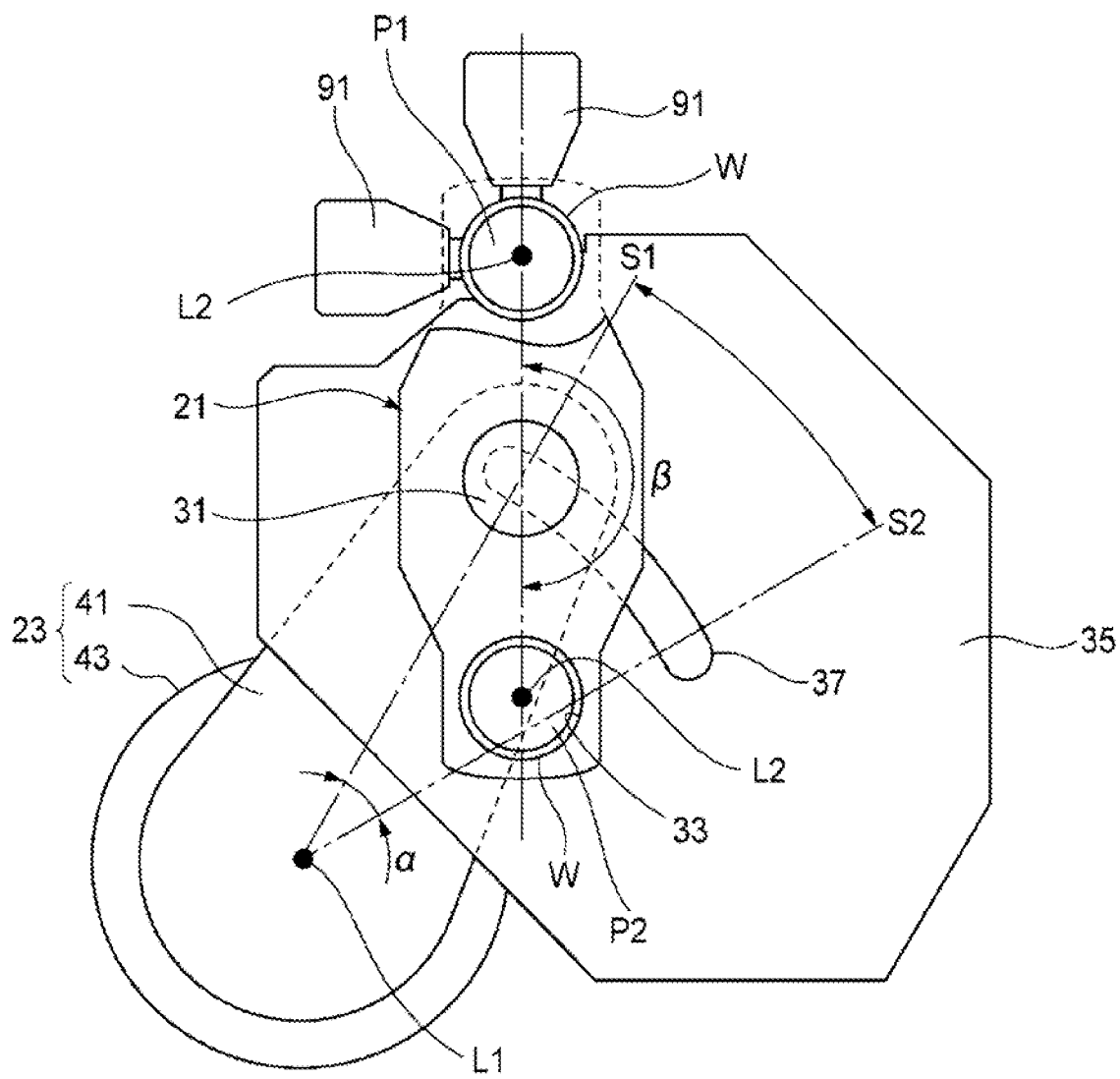
FIG. 4 is a plan view of the workpiece changer.

The loading member 21 is formed in an elongated plate shape as shown in FIG. 4, and an intermediate portion thereof is vertically supported by a rotation shaft 31 and is rotatable about the rotation shaft 31.

The loading member 21 is provided with workpiece holding portions 33 configured to hold the workpiece W at two radially outer edge portions.

Specifically, the workpiece holding portions 33 are respectively provided at one end portion and the other end portion in a longitudinal direction of the loading member 21 at positions equidistant from the rotation shaft 31 in the radial direction.

The workpiece holding portions 33 are respectively disposed at the processing position P1 where processing of the workpiece W is performed by the processing device, and a replacement position P2 where the workpiece W is transferred and replaced.

Positions of the pair of workpiece holding portions 33 are switched by reversal (180° rotation) of the loading member 21 about the rotation shaft 31.

The workpiece holding portion 33 has a hole whose diameter is slightly larger than a diameter of the workpiece W. The workpiece W is taken in and out from above the workpiece holding portion 33 (an upper side in FIG. 3, a proximal side in a direction perpendicular to a paper plane of FIG. 4).

A table 35 is provided below the loading member 21.

The table 35 has an opening 37 which is an arc-shaped long hole through which the rotation shaft 31 is inserted (see FIG. 4).

The opening 37 is formed in an arc shape centered on a central axis of a swing drive shaft 51 of a swing portion 43 (described later) of the loading member supporting mechanism 23.

An outer circumferential surface of the workpiece W in the workpiece holding portion 33 is held by an inner circumferential surface of the workpiece holding portion 33 in a state where a lower portion of the workpiece W is in contact with the table 35.

When the loading member 21 is rotated about the rotation shaft 31, the workpiece W moves while sliding on an upper surface of the table 35 in a sated of being accommodated in the workpiece holding portion 33.

The loading member supporting mechanism 23 supports the loading member 21 by the rotation shaft 31.

The loading member supporting mechanism 23 movably supports the loading member 21 in a plane perpendicular to an axial direction of the rotation shaft 31.

The loading member supporting mechanism 23 includes an arm 41 and a swing portion 43.

The arm 41 having a box shape formed of a pair of facing members supports the rotation shaft 31 of the loading member 21 at a distal end portion thereof.

The swing portion 43 swingably supports a base end portion of the arm 41 which is on a side opposite to the rotation shaft 31.

The rotation shaft 31 is supported by a shaft supporting portion 45 integrated with a driven pulley 47 at the distal end portion of the arm 41.

The rotation shaft 31 includes a head portion and a shaft portion. The shaft portion penetrates the opening 37 of the table 35, and is fixed to the shaft supporting portion 45 on an arm 41-side. The head portion is fixed to the intermediate portion of the loading member 21.

The driven pulley 47 is accommodated in the arm 41.

As shown in FIG. 3, the swing portion 43 includes a swing drive shaft 51 having a cylindrical shape.

The swing drive shaft 51 is rotatably supported via a bearing 59 by a support cylinder portion 57 provided on a stand 55.

An upper end portion of the swing drive shaft 51 is coupled to the base end portion of the arm 41, and the swing drive shaft 51 and the arm 41 are integrally formed.

Thereby, the base end portion of the arm 41 is swingably supported by the swing portion 43.

In this way, the loading member supporting mechanism 23 displaces the rotation shaft 31 provided at the distal end portion of the arm 41 in an arc about the swing drive shaft 51 of the swing portion 43, and displaces the loading member 21 supported by the rotation shaft 31 in the plane perpendicular to the axial direction of the rotation shaft 31.

In a case of the vertical shape, the loading member 21 is moved in a horizontal plane, but the axial direction of the rotation shaft 31 is not necessarily limited to a vertical direction, and may be inclined from the vertical direction.

The rotation drive unit 25 includes a rotation drive shaft 61, a rotation transmission member 63 and a rotation motor 65.

The rotation drive shaft 61 is inserted into the swing drive shaft 51 of the swing portion 43 and is disposed coaxially with the swing drive shaft 51.

Portions of the rotation drive shaft 61 in vicinities of upper and lower ends thereof are rotatably supported by the swing drive shaft 51 via bearings 67.

A drive pulley 69 is fixed to an upper end portion of the rotation drive shaft 61.

The drive pulley 69 is accommodated in the arm 41.

The rotation transmission member 63 is formed of, for example, an endless belt, and is hung between the driven pulley 47 of the rotation shaft 31 of the loading member 21 and the drive pulley 69 of the rotation drive shaft 61.

The rotation motor 65 is formed of a servomotor and is disposed below the rotation drive shaft 61.

The rotation drive shaft 61 is coupled to a drive shaft 71 of the rotation motor 65.

The rotation drive shaft 61 is driven to rotate by the rotation motor 65.

The rotation transmission member 63 transmits rotation of the rotation drive shaft 61 to the rotation shaft 31 of the loading member 21.

Thereby, the loading member 21 is driven to rotate integrally with the rotation shaft 31.

The displacement drive unit 27 includes a swing motor 75, a drive gear 77 and a driven gear 79.

The swing motor 75 is formed of an external servomotor. The drive gear 77 is fixed to a drive shaft 81 of the swing motor 75.

The driven gear 79 is fixed to a lower end portion of the swing drive shaft 51 constituting the swing portion 43.

The drive gear 77 and the driven gear 79 are meshed with each other, and transmit rotation of the swing motor 75 to the swing drive shaft 51.

Thereby, the arm 41 supported by the swing drive shaft 51 is swung by drive of the swing motor 75.

The swing motor 75 may be built in a housing (not shown) of the displacement drive unit 27 as a built-in structure.

A transmission method of a rotational force of the swing motor 75 to the swing drive shaft 51 is not limited to a transmission method using gears, but may be another method such as a transmission method using a belt.

In this way, in the workpiece changer 200, the swing motor 75 configured to drive the swing drive shaft 51 and the rotation motor 65 configured to drive the rotation drive shaft 61 are provided so as to be individually drivable.

FIG. 4 is a plan view of the workpiece changer.

The displacement drive unit 27 shown in FIG. 3 rotates the swing drive shaft 51 by the swing motor 75 to swing the arm 41, thereby displacing the loading member 21 between a workpiece set state S1 and a workpiece retracted state S2.

In the workpiece set state S1, the workpiece holding portions 33 are respectively disposed at the replacement position P2 and the processing position P1 by the loading member supporting mechanism 23. In the workpiece retracted state S2, the workpiece holding portions 33 are disposed away from the replacement position P2 and the processing position P1.

When the loading member 21 is in the workpiece set state S1, a plurality of shoes 91 are disposed at the processing position P1 where one workpiece holding portion 33 is disposed.

As shown in FIG. 2, these shoes 91 are fixed on a support base 93 of the processing device.

The support base 93 is disposed below the table 35, and the shoes 91 fixed to the support base 93 support an outer circumference of the workpiece W disposed at the processing position P1.

The processing device includes, for example, a processing tool such as a grindstone, and the processing tool is provided so as to be able to move (cut) in an in-plane direction of an upper surface of the support base 93 and vertically move (send) up and down.

Processing on the workpiece W is performed by moving the processing tool relative to the workpiece W disposed at the processing position P1.

In the workpiece changer 200 configured as described above, while the loading member supporting mechanism 23 moves the loading member 21 from the workpiece set state S1 to the workpiece retracted state S2 and returns to the workpiece set state S1 again, the displacement drive unit 27 and the rotation drive unit 25 perform a workpiece replacement operation of replacing the workpiece W at the processing position P1. The workpiece replacement operation includes a sending operation and a feeding operation described below.

In the sending operation, the displacement drive unit 27 and the rotation drive unit 25 arrange the workpiece holding portion 33, which is disposed at the processing position P1, at the replacement position P2 in a trajectory in which the loading member 21 does not interfere with the shoes 91.

In the feeding operation, the displacement drive unit 27 and the rotation drive unit 25 arrange the workpiece holding portion 33, which is disposed at the replacement position P2, at the processing position P1.

When the workpiece W is replaced once for the processing position P1 by simultaneously performing the sending operation and the feeding operation, a rotation amount α for moving (swinging) the rotation shaft 31 in an arc is smaller than a rotation amount β (β=180°) of the loading member 21 about the rotation shaft 31.

(Workpiece Conveyance Unit)

As shown in FIG. 2, the workpiece conveyance unit 300 includes, for example, a belt conveyor, and conveys the workpiece W.

The workpiece conveyance unit 300 includes a workpiece supply position P3 where the unprocessed workpiece W is continuously supplied and a workpiece reception position P4 where the processed workpiece W is placed.

The unprocessed workpiece W supplied from the previous step is conveyed toward the workpiece supply position P3 (in a direction of an arrow A in FIG. 2).

The processed workpiece W placed at the workpiece reception position P4 is conveyed toward the next step (in a direction of an arrow B in FIG. 2).

The workpiece conveyance unit 300 is not limited to a single belt conveyor, but may be a plurality of belt conveyors, and may have a function of supplying the workpiece W to the workpiece supply position P3 and conveying the workpiece W from the workpiece reception position P4 to a subsequent stage.

(Pick-and-Place Mechanism)

The pick-and-place mechanism 400 includes a column 101, a pickup support body 103 and a gripping mechanism 105.

The pickup support body 103 is supported so as to be swingable about the column 101 and movable up and down.

The gripping mechanism 105 is supported by a distal end of the pickup support body 103.

The gripping mechanism 105 includes a pair of chucks 107, each of which includes a gripping pin 109 extending downward.

The gripping mechanism 105 is configured to grip and release the workpiece W by moving the chucks 107 each having the gripping pin 109 in directions close to and away from each other in a horizontal plane.

The pick-and-place mechanism 400 brings a pair of gripping pins 109 close to each other, lowers the pickup support body 103, and inserts the gripping pins 109 into the ring-shaped workpiece W.

Then, by causing the chucks 107 away from each other, the workpiece W is gripped from an inner circumferential side by the pair of gripping pins 109 in the workpiece W.

Then, the workpiece W gripped by the chucks 107 is lifted by raising the pickup support body 103.

Then, the gripped workpiece W is horizontally moved by swinging the pickup support body 103.

When the workpiece W is disposed at a movement destination, the workpiece W is moved to the movement destination by the pickup support body 103, and then the pickup support body 103 is lowered and the chucks 107 of the gripping mechanism 105 are brought close.

Thereby, the gripping of the workpiece W by the gripping pins 109 is released, and the workpiece W is placed on the movement destination.

Thereafter, the pickup support body 103 is raised to remove the gripping pins 109 from the workpiece W.

The pick-and-place mechanism 400 configured to move the workpiece has a function of alternately performing a loading operation and an unloading operation on the workpiece W.

The loading operation is a supply operation in which the unprocessed workpiece W disposed at the workpiece supply position P3 of the workpiece conveyance unit 300 is gripped to be transferred and supplied to the workpiece holding portion 33 of the loading member 21 disposed at the replacement position P2.

The unloading operation is a discharge operation in which the processed workpiece W gripped by the workpiece holding portion 33 disposed at the replacement position P2 of the loading member 21 is gripped to be transferred and discharged to the workpiece reception position P4 of the workpiece conveyance unit 300.

Since the loading operation and the unloading operation by the pick-and-place mechanism 400 are performed while the workpiece W is being processed by the processing device, tact time is not affected, for example, in a state of waiting for conveyance during non-processing time.

(Operation of Workpiece Conveyance Device)

Next, a specific operation of the workpiece conveyance device 500 including the workpiece changer 200 will be described.

Figure 5A:
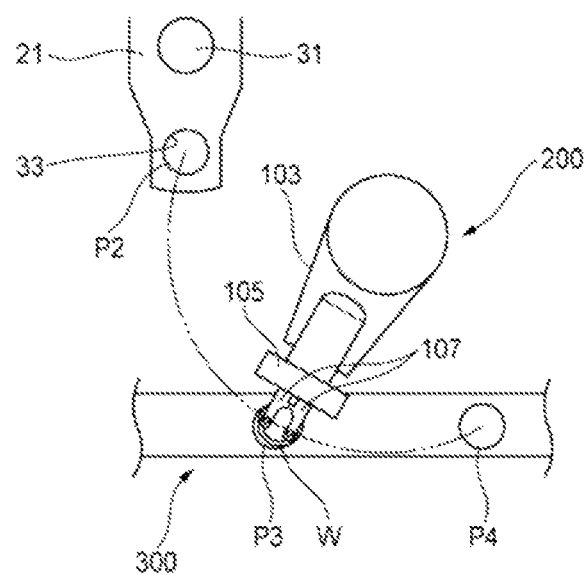
FIGS. 5A and 5B are schematic plan views showing a loading operation by a pick-and-place mechanism.
Figure 5B:
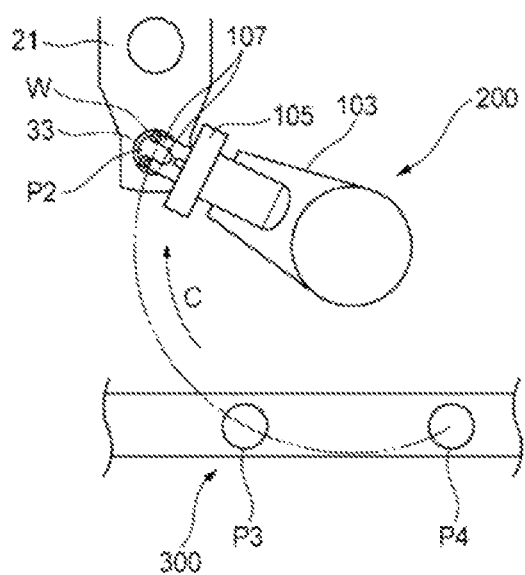

FIGS. 5A and 5B are schematic plan views showing the loading operation by the pick-and-place mechanism 400.

Figure 6A:
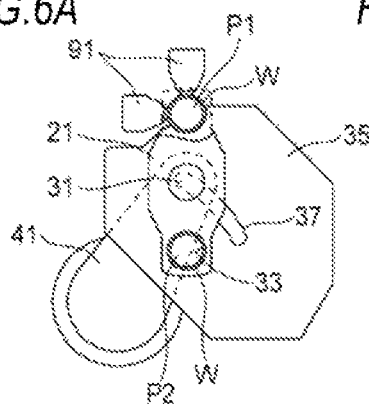
FIGS. 6A to 6E are schematic plan views showing a workpiece replacement operation by the workpiece changer.
Figure 6B:
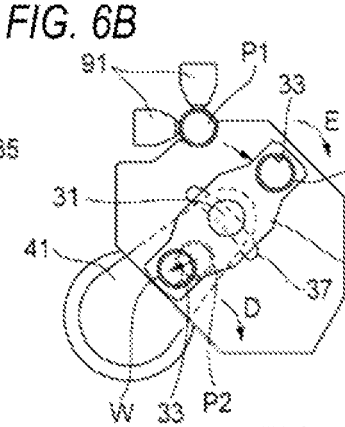
Figure 6C:
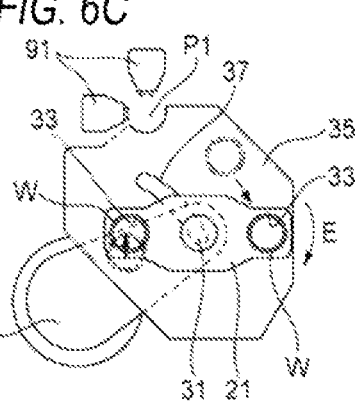

FIGS. 6A to 6E are schematic plan views showing the workpiece replacement operation by the workpiece changer 200. FIG. 6A shows the workpiece set state S1, and FIG. 6C shows the workpiece retracted state S2.

Figure 7A:
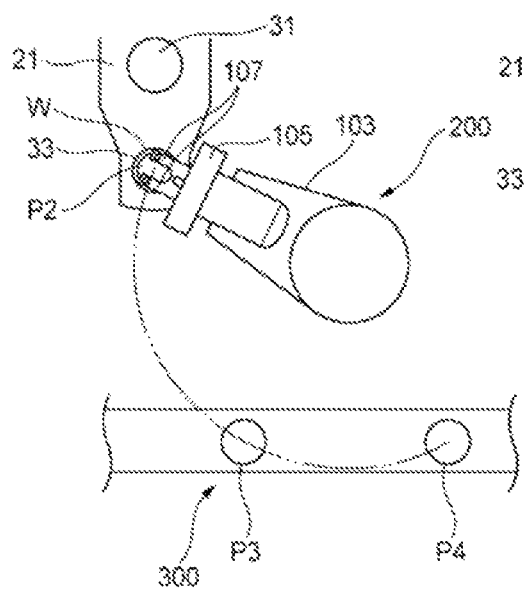
FIGS. 7A and 7B are schematic plan views showing an unloading operation by the pick-and-place mechanism.
Figure 7B:
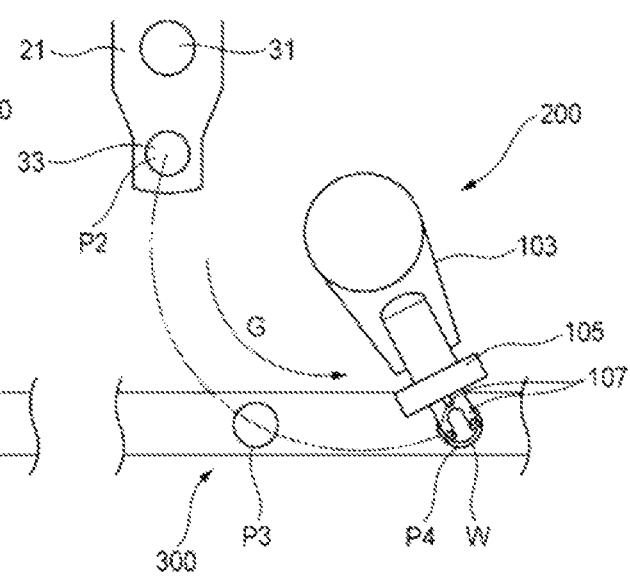

FIGS. 7A and 7B are schematic plan views showing the unloading operation by the pick-and-place mechanism 400.

(Loading Operation)

As shown in FIG. 5A, when the unprocessed workpiece W is conveyed to the workpiece supply position P3 of the workpiece conveyance unit 300, the unprocessed workpiece W disposed at the workpiece supply position P3 is gripped by the chucks 107 of the pick-and-place mechanism 400.

Thereafter, as shown in FIG. 5B, the pickup support body 103 swings toward the replacement position P2 (in a direction of an arrow C in FIG. 5B), and the unprocessed workpiece W is transferred to the workpiece holding portion 33 disposed at the replacement position P2 of the loading member 21.

(Workpiece Replacement Operation)

As shown in FIG. 6A, when the unprocessed workpiece W is transferred to the workpiece holding portion 33 at the replacement position P2 and processing on the workpiece W of the workpiece holding portion 22 at the processing position P1 is completed, the workpiece replacement operation including the sending operation and the feeding operation by the workpiece changer 200 is started.

In the sending operation, firstly, the swing motor 75 of the displacement drive unit 27 and the rotation motor 65 of the rotation drive unit 25 shown in FIG. 3 are driven. Then, as shown in FIG. 6B, the arm 41 swings from a position of the workpiece set state S1 toward the workpiece retracted state S2 (in a direction of an arrow D in FIG. 6B), and the loading member 21 rotates in a direction the same as that of the arm 41 (in a direction of an arrow E in FIG. 6B) (also see FIG. 4).

Thereby, the loading member 21 in the workpiece set state S1 rotates about an axis L2 of the rotation shaft 31 while swinging about an axis L1 of the swing drive shaft 51 shown in FIG. 3.

Then, the workpiece holding portion 33 disposed at the processing position P1 of the loading member 21 is separated from the processing position P1, and the workpiece W held by the workpiece holding portion 33 is moved in a direction away from the shoes 91.

Thereafter, as shown in FIG. 6C, the loading member 21 reaches the workpiece retracted state S2 (also see FIG. 4), and the sending operation is shifted to the feeding operation.

In the feeding operation, drive of the swing motor 75 of the displacement drive unit 27 is reversed while rotation of the loading member 21 in the direction of the arrow E by the rotation motor 65 of the rotation drive unit 25 shown in FIG. 3 is continued.

Figure 6D:
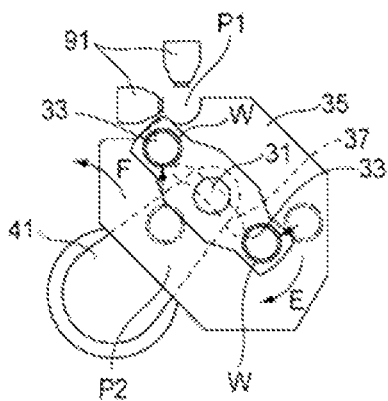

Thereby, as shown in FIG. 6D, the arm 41 swings toward the workpiece set state S1 (in a direction of an arrow F in FIG. 6D).

Then, the workpiece holding portion 33 holding the processed workpiece W is moved toward the replacement position P2, and the workpiece holding portion 33 holding unprocessed workpiece W is moved toward the processing position P1.

At this time, in order to avoid interference between the shoes 91 and the workpiece W, a control device (not shown) controls the loading member 21 and the arm 41 such that the loading member 21 is further rotated in the E direction from FIG. 6D before the arm 41 reaches the position of the workpiece set state S1 and then the arm 41 reaches the position of the workpiece set state S1.

Figure 6E:
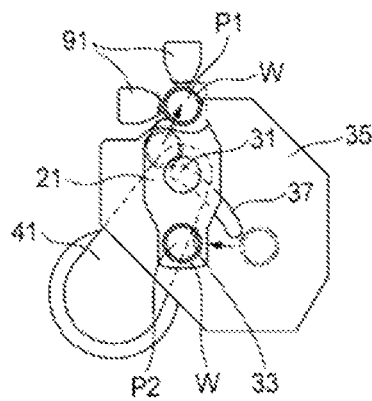

Thereafter, as shown in FIG. 6E, when the loading member 21 reaches the workpiece set state S1 (also see FIG. 4), the workpiece holding portion 33 holding the processed workpiece W is disposed at the replacement position P2, and the workpiece holding portion 33 holding the unprocessed workpiece W is disposed at the processing position P1.

At this time, the unprocessed workpiece W is gradually disposed at the processing position P1 without interfering with the shoes 91.

(Unloading Operation)

As shown in FIG. 7A, when the workpiece holding portion 33 of the loading member 21 holding the processed workpiece W is disposed at the replacement position P2, the processed workpiece W held by the workpiece holding portion 33 is gripped by the chucks 107 of the pick-and-place mechanism 400.

Thereafter, as shown in FIG. 7B, the pickup support body 103 swings toward the workpiece reception position P4 (in a direction of an arrow G in FIG. 7B), and the processed workpiece W is placed at the workpiece reception position P4 of the workpiece conveyance unit 300.

Here, an example of processing on the workpiece W at the processing position P1 and a retraction direction of the workpiece W will be described.

Figure 8A:
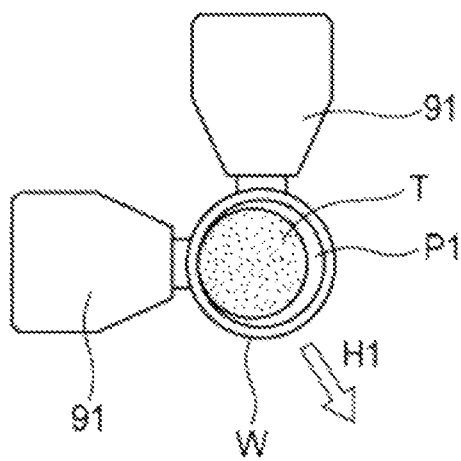
FIGS. 8A to 8C are plan views at a processing position for showing an example of processing on a workpiece and a retraction direction of the workpiece.
Figure 8B:
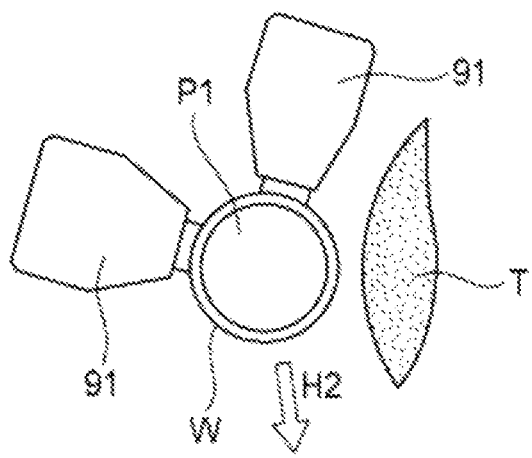
Figure 8C:
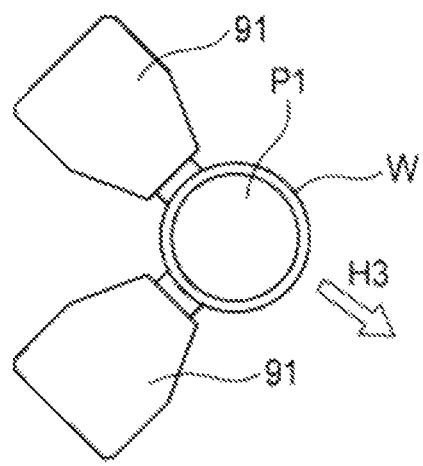

FIGS. 8A to 8C are plan views at a processing position for showing an example of processing on a workpiece and a retraction direction of the workpiece.

(Inner Diameter Polishing)

As shown in FIG. 8A, in a case where an inner circumferential surface of the workpiece W is polished, a processing tool T, which is rotationally driven and which has a grindstone having a circular shape in an axial cross section, is disposed at the processing position P1 and is disposed inside of the workpiece W supported by a pair of shoes 91.

Then, the processing tool T comes into contact with the inner circumferential surface of the workpiece W, and the inner circumferential surface of the workpiece W is polished.

In a case of this processing example, when the processing tool T is moved in an axial direction (a depth direction in FIG. 8A) after processing, the workpiece W is moved in a direction away from the shoes 91 (in a direction of an arrow H1 in FIG. 8A) by the sending operation of the workpiece replacement operation.

(Outer Diameter Polishing)

As shown in FIG. 8B, in a case where an outer circumferential surface of the workpiece W is polished, the processing tool T, which is rotationally driven and which has a grindstone having a circular shape in the axial cross section, approaches the processing position P1 and is disposed outside the workpiece W supported by the pair of shoes 91.

Then, the processing tool T comes into contact with the outer circumferential surface of the workpiece W, and the outer circumferential surface of the workpiece W is polished.

In a case of this processing example, when the processing tool T is retracted after processing, the workpiece W is moved in a direction away from the shoes 91 (in a direction of an arrow H2 in FIG. 8B) by the sending operation of the workpiece replacement operation.

(Other Processing)

As shown in FIG. 8C, in a case of other various types of processing, the workpiece W is moved in a direction away from the shoes 91 (in a direction of an arrow H3 in FIG. 8C) by the sending operation of the workpiece replacement operation.

The leaving directions H1, H2, H3 of the workpiece W from the processing position P1 are appropriately changed according to positions or the like of the shoes 91 that vary depending on a processing portion of the workpiece W or a processing step.

As described above, according to this configuration, while the loading member supporting mechanism 23 moves the loading member 21 from the workpiece set state S1 to the workpiece retracted state S2 and returns to the workpiece set state S1 again, the displacement drive unit 27 and the rotation drive unit 25 simultaneously perform replacement of the workpiece W between the processing position P1 and the replacement position P2 in the trajectory in which the loading member 21 does not interfere with the shoes 91.

Therefore, as compared with a case where movement and rotation of the loading member 21 are performed separately, the replacement operation of the workpiece W can be performed at high speed and productivity can be improved.

Since all mechanisms that move the loading member 21 are rotation mechanisms, a sliding portion can be easily sealed by an O-ring or the like.

As a result, the intrusion of dust or foreign matters to a sliding surface can be reliably prevented, and the flexibility for a usage environment is increased.

Timings of movement of the loading member supporting mechanism 23 by the displacement drive unit 27, the rotation of the loading member 21 by the rotation drive unit 25 and the like can be adjusted only by changing a drive program for driving units of the workpiece changer 200.

That is, the movement during the replacement operation of the workpiece W can be adjusted to various paths according to the positions or the like of the shoes 91 that vary depending on the processing portion of the workpiece W or the processing step.

Therefore, even if the positions or the like of the shoes 91 are changed according to a type of the workpiece W, a processing content or the like, a structure of the workpiece conveyance device or arrangement of components of each part almost need not to be changed, and adjustment work can be completed easily and quickly.

In this way, versatility of the workpiece conveyance device can be greatly improved.

For example, in a loading device such as a related-art cassette loader, it is necessary to exchange or adjust an in-shoot and an out-shoot, to replace a guide plate that loads and unloads a workpiece to and from a processing position, to replace various components such as an arrangement stopper, and a long time and a large effort are required for a setup-change.

In contrast, in the workpiece changer 200 according to the present configuration, merely by replacing only the loading member 21 including the workpiece holding portion 33 that holds the workpiece W, it is possible to easily and quickly deal with a change in the workpiece W to be processed and to smoothly perform setup-change work.

Second Example

In the workpiece changer according to the first example described above, the rotation motor 65 of the rotation drive unit 25 and the swing motor 75 of the displacement drive unit 27 are separately provided, but a biaxial integrated-type motor may be used as a motor of the rotation drive unit 25 and the displacement drive unit 27.

Figure 9:
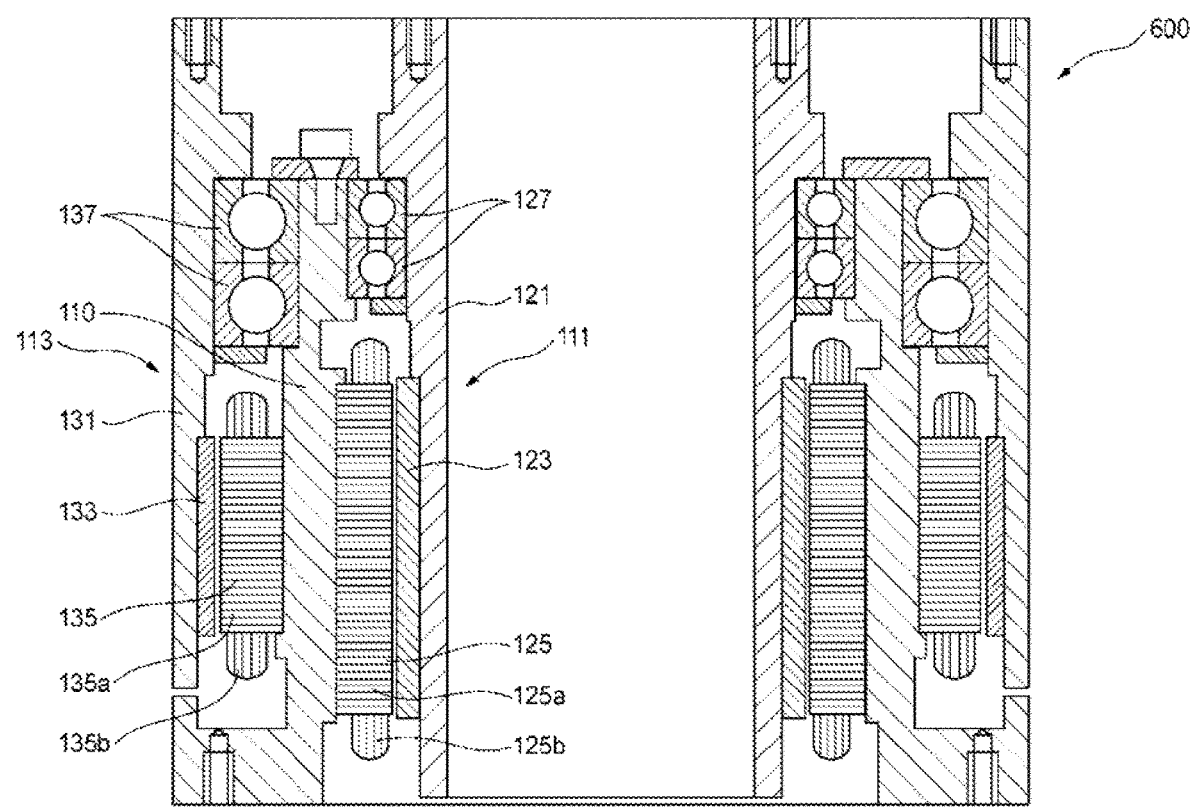
FIG. 9 is a schematic cross-sectional view taken along an axial direction of a motor for showing a second example including a biaxial integrated-type motor.

FIG. 9 is a schematic cross-sectional view taken along an axial direction of a motor for showing a second example including a biaxial integrated-type motor.

As shown in FIG. 9, a biaxial integrated-type motor 600 includes a cylindrical base 110, an inner axis rotor 111 formed on an inner circumferential side of the base 110, and an outer axis rotor 113 formed on an outer circumferential side of the base 110.

In the biaxial integrated-type motor 600, the rotation motor 65 includes the inner axis rotor 111, and the swing motor 75 includes the outer axis rotor 113.

The inner axis rotor 111 includes a rotor yoke 121 provided inside the base 110, a plurality of magnets 123 disposed annularly along an outer circumferential surface of the rotor yoke 121, and a core 125 provided on an inner circumferential surface of the base 110.

The rotor yoke 121 is rotatably supported by a rolling bearing 127 at an upper end portion of the base 110, and the rotation drive shaft 61 is coupled to an upper end portion of the rotor yoke 121.

The core 125 includes an iron core 125a and a coil 125b wound around the iron core 125a.

The outer axis rotor 113 includes a rotor yoke 131 provided outside the base 110, a plurality of magnets 133 disposed annularly along an inner circumferential surface of the rotor yoke 131, and a core 135 provided on an outer circumferential surface of the base 110.

The rotor yoke 131 is rotatably supported by a rolling bearing 137 at the upper end portion of the base 110, and the swing drive shaft 51 is coupled to an upper end portion of the rotor yoke 121.

The core 135 includes an iron core 135a and a coil 135b wound around the iron core 135a.

The rotor yoke 121 of the inner axis rotor 111 is coupled to the rotation drive shaft 61 shown in FIG. 3, and the rotor yoke 131 of the outer axis rotor 113 is coupled to the swing drive shaft 51 shown in FIG. 3.

The inner axis rotor 111 rotationally drives the rotor yoke 121 with respect to the base 110 by supplying electric power to the coil 125b of the core 125.

The outer axis rotor 113 rotationally drives the rotor yoke 131 with respect to the base 110 by supplying electric power to the coil 135b of the core 135.

When the rotor yoke 131 of the outer axis rotor 113 rotates, the rotation drive shaft 61 is rotated, the rotation is transmitted to the rotation shaft 31, and the loading member 21 is rotated.

The outer axis rotor 113 rotationally drives the rotor yoke 131 with respect to the base 110 by supplying electric power to the coil 135b of the core 135.

When the rotor yoke 131 of the outer axis rotor 113 rotates, the swing drive shaft 51 is rotated to swing the arm 41, and the loading member 21 is moved.

If the biaxial integrated-type motor 600 is used as the motor that drives the rotation drive unit 25 and the displacement drive unit 27 as described in this configuration, a size of the device can be reduced.

Third Example

Next, a third example of the workpiece changer 200 will be described.

Components which are the same as those of the workpiece changer 200 as described above are denoted by the same reference numerals, and description thereof will be omitted.

Figure 10:
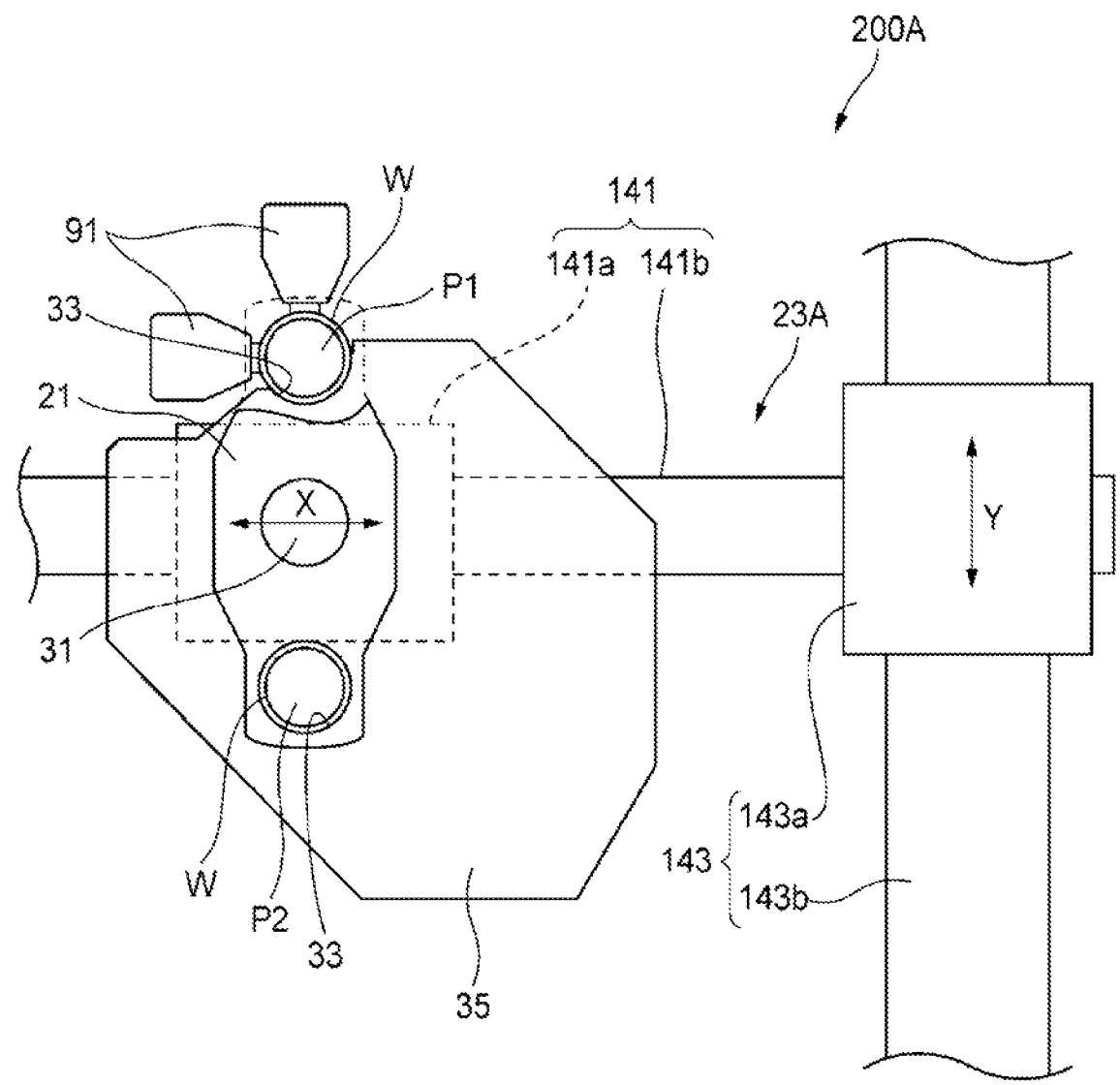
FIG. 10 is a plan view of a workpiece changer according to a third example.

FIG. 10 is a plan view of a workpiece changer according to a third example.

As shown in FIG. 10, in a workpiece changer 200A according to the present configuration, a loading member supporting mechanism 23A includes a first linear motion stage 141 and a second linear motion stage 143.

The first linear motion stage 141 includes a slider 141a and a movement rail 141b. The second linear motion stage 143 includes a slider 143a and a movement rail 143b.

The slider 141a of the first linear motion stage 141 supports the rotation shaft 31 of the loading member 21.

The first linear motion stage 141 moves the loading member 21 in an X direction by moving the slider 141a along the movement rail 141b.

The slider 143a of the second linear motion stage 143 integrally supports the movement rail 141ba of the first linear motion stage 141.

The second linear motion stage 143 moves the loading member 21 in a Y direction by moving the slider 143a along the movement rail 143b.

Thereby, in the workpiece changer 200A according to the present configuration, the loading member 21 can be moved independently in the X direction and the Y direction in a plane (a horizontal plane) perpendicular to the axial direction of the rotation shaft 31. Therefore, the workpiece replacement operation for moving the loading member 21 between the workpiece set state S1 and the workpiece retracted state S2 can be implemented with high efficiency by reducing restriction in a moving direction.

Therefore, according to the workpiece changer 200A according to the present configuration, the rotation shaft 31 of the loading member 21 mounted on the slider 141a by the first linear motion stage 141 and the second linear motion stage 143 can be freely moved in any direction in the horizontal plane, and the loading member 21 can be moved in any trajectory without being limited to the arc trajectory.

Therefore, the loading member 21 can be efficiently displaced to the workpiece set state S1 and the workpiece retracted state S2 while avoiding interference with peripheral members such as the shoes 91.

Fourth Example

Figure 11:
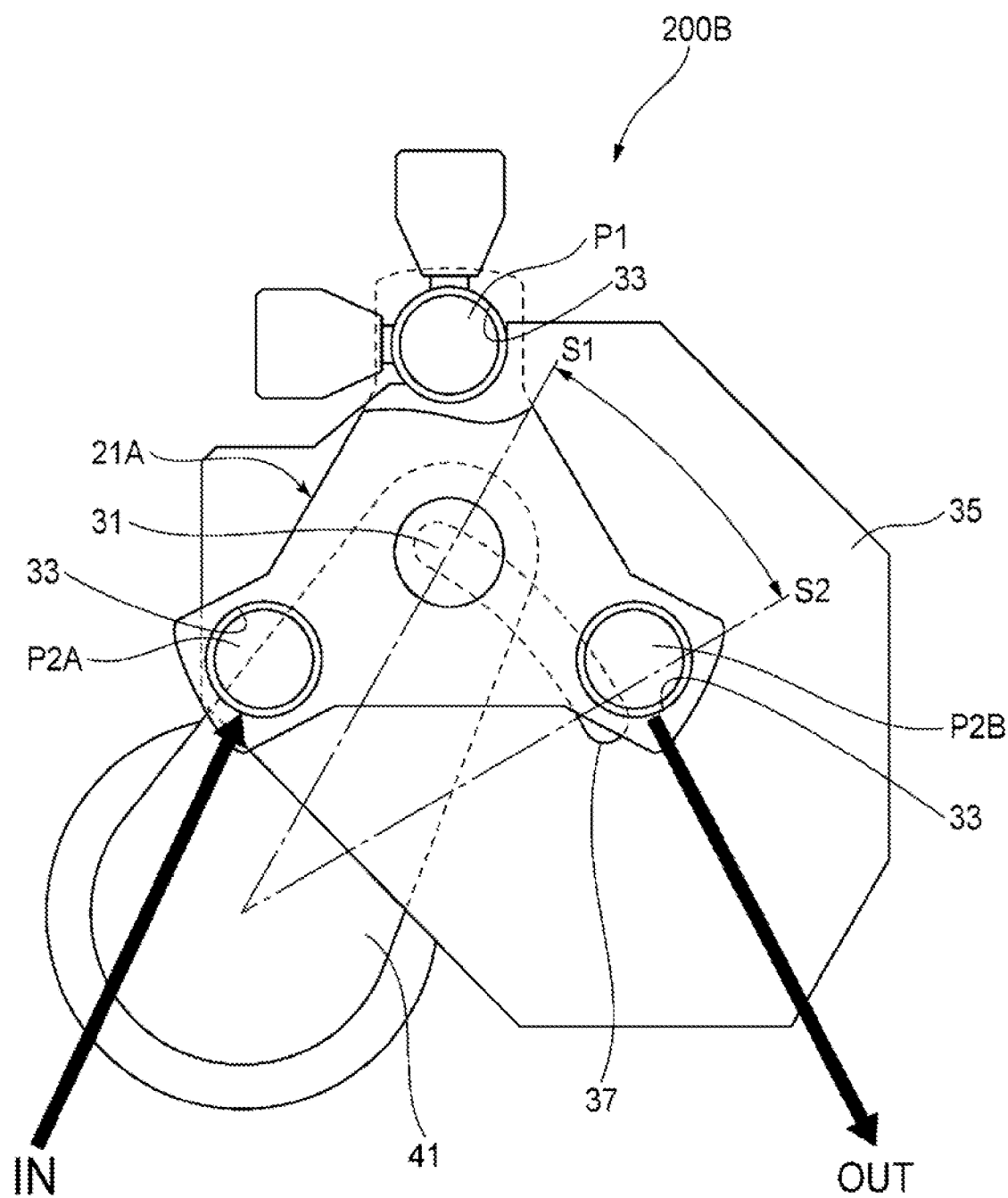
FIG. 11 is a plan view of a workpiece changer according to a fourth example.

FIG. 11 is a plan view of a workpiece changer according to a fourth example.

As shown in FIG. 11, a workpiece changer 200B according to the present configuration includes a loading member 21A having a substantially triangular shape in a plan view, and a center thereof is supported by the rotation shaft 31 and rotated.

The loading member 21A is provided with the workpiece holding portions 33 at three corners which are radially outer edge portions in rotation.

In the workpiece changer 200B according to the present configuration, when one workpiece holding portion 33 is disposed at the processing position P1, the other two workpiece holding portions 33 are disposed at different replacement positions P2A, P2B.

Therefore, while the workpiece W is processed at the processing position P1, the pick-and-place mechanism 400 can supply the unprocessed workpiece W by the loading operation on the workpiece holding portion 33 at one replacement position P2A, and discharge the processed workpiece W by the unloading operation on the workpiece holding portion 33 at the other replacement position P2B.

Since the loading operation and the unloading operation can be performed simultaneously in this way, for example, in a case where processing time of the workpiece W is shorter than the total time of workpiece replacement in which the loading operation and the unloading operation are sequentially performed, the state of waiting for conveyance during non-processing time can be prevented and the tact time can be shortened.

Thereby, work efficiency can be improved and productivity can be increased.

Figure 12:
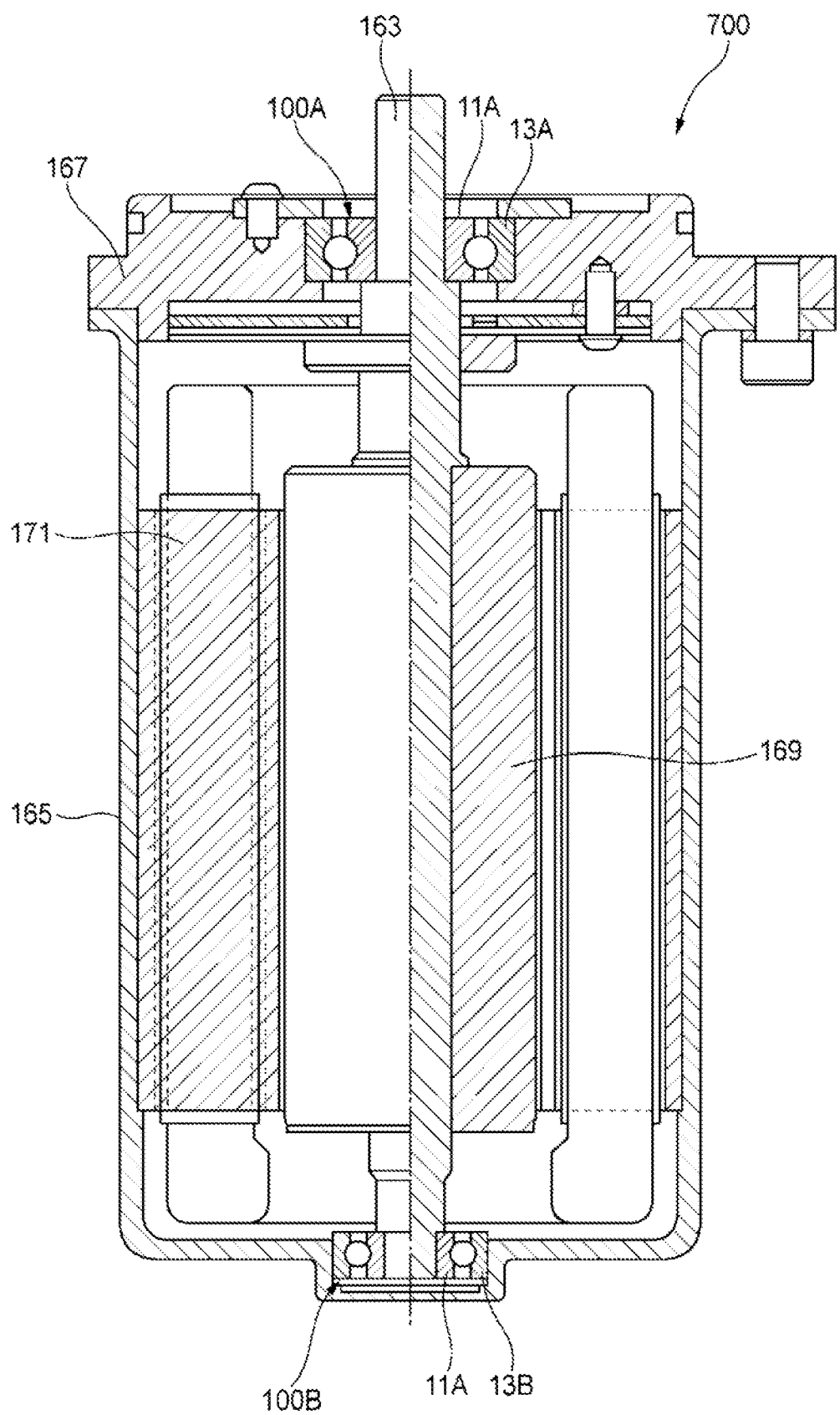
FIG. 12 is a schematic cross-sectional view of a motor using a bearing including an outer ring and an inner ring which are ring-shaped workpieces.

The workpiece changer according to each example described above can be applied to a workpiece conveyance device that moves and conveys a ring-shaped workpiece such as inner rings 11A, 11B and outer rings 13A, 13B of bearings 100A, 100B supporting a rotation shaft 163 of a motor 700 shown in FIG. 12, for example, a workpiece processing device including the workpiece conveyance device, a ring bearing manufacturing device for manufacturing a ring bearing, and the like.

The motor 700 exemplified here is a brushless motor, and includes a cylindrical center housing 165 and a substantially disk-shaped front housing 167 that closes one open end of the center housing 165.

The rotatable rotation shaft 163 is supported inside the center housing 165 along an axial center thereof via the bearings 100A, 100B disposed at the front housing 167 and a bottom portion of the center housing 165.

A motor drive rotor 169 is provided around the rotation shaft 163, and a stator 171 is fixed to an inner circumferential surface of the center housing 165.

The motor 700 configured as described above is generally installed in a machine or a vehicle, and rotationally drives the rotation shaft 163 supported by the bearings 100A, 100B.

In addition, the present invention is applicable when moving, conveying, or processing a ring-shaped workpiece such as a rotation support portion of a linear motion device such as a machine having a rotation portion, various manufacturing devices, for example, a screw device such as a ball screw device, and an actuator (a combination of a linear motion guide bearing and a ball screw, an XY table and the like); a rotation support portion of a steering device such as a steering column, a universal joint, an intermediate gear, a rack and pinion, an electric power steering device and a worm reducer; and a rotation support portion of a vehicle such as an automobile, a motorcycle and a railway.

In this way, a ring-shaped component (workpiece) applied to a portion that rotates relatively can be suitably used in the devices described above, and productivity and product quality can be improved by manufacturing the component using the devices.

The present invention is not limited to the above-mentioned embodiment, and modifications and applications made by one skilled in the art based on a combination of configurations in the embodiment, description in the specification, and well-known art, are plans of the present invention and thus fall within the scope of protection.

Although the processing device has been described as having a vertical configuration, the processing device may have a horizontal configuration.

The vertical processing device is preferable since the flexibility in arranging a tool drive motor in an upper-lower direction is higher than in a case of the horizontal processing device, and an overall size of the device can be reduced.

The workpiece is horizontally moved to the processing position of the processing device to be replaced, which is less affected by gravity than a case of a horizontal workpiece changer that performs replacement by moving the workpiece in the upper and lower direction, and the flexibility in designing a movement path of the workpiece is increased.

As described above, the present specification discloses the following matters.

(1) A workpiece changer configured to replace a ring-shaped workpiece between a replacement position of the workpiece and a processing position for processing the workpiece, the workpiece changer comprising:

a loading member rotatably supported about a rotation shaft, the loading member provided with workpiece holding portions configured to hold the workpiece at at least two radially outer edge portions;

a loading member supporting mechanism configured to movably support the loading member in a plane perpendicular to an axial direction of the rotation shaft;

a rotation drive unit configured to rotationally drive the loading member about the rotation shaft; and a displacement drive unit configured to drive and displace the loading member supporting mechanism between a workpiece set state in which the workpiece holding portions are respectively disposed at the replacement position and the processing position and a workpiece retracted state in which the workpiece holding portions are disposed away from the replacement position and the processing position, wherein a shoe configured to support an outer circumference of the workpiece is disposed at the processing position, wherein while the loading member supporting mechanism moves the loading member from the workpiece set state to the workpiece retracted state and returns to the workpiece set state again, the displacement drive unit and the rotation drive unit perform an operation of disposing the workpiece holding portion arranged at the processing position to the replacement position and an operation of disposing the workpiece holding portion disposed at the replacement position to the processing position in a trajectory in which the loading member does not interfere with the shoe.

According to the workpiece changer, while the loading member supporting mechanism moves the loading member from the workpiece set state to the workpiece retracted state and returns to the workpiece set state again, the displacement drive unit and the rotation drive unit simultaneously perform the replacement of the workpiece between the processing position and the replacement position in the trajectory in which the loading member does not interfere with the shoe.

Therefore, a workpiece replacement operation can be performed high speed and productivity can be improved.

A structure of the device or arrangement of components need not to be changed depending on a position of the shoe or the like, and versatility can be improved.

In addition, by replacing only the loading member including the workpiece holding portion and merely changing a drive program, it is possible to easily and quickly deal with a change in the workpiece or a processing content and to greatly reduce time and effort required for a setup-change.

(2) In the workpiece changer according to (1), the loading member is provided with the workpiece holding portions respectively at one end portion and the other end portion in a longitudinal direction at positions equidistant from the rotation shaft in the radial direction, and positions of the pair of workpiece holding portions are switched by reversing about the rotation shaft.

According to the workpiece changer, the loading member is rotated such that the positions of the workpiece holding portions are reversed, so that the workpiece holding portions can be easily switched between the processing position and the replacement position.

(3) In the workpiece changer according to (1) or (2), the loading member supporting mechanism moves the rotation shaft in an arc.

According to the workpiece changer, the loading member supporting mechanism moves the rotation shaft supporting the loading member in an arc, so that the loading member can easily and accurately displaced to the workpiece set state and the workpiece retracted state.

(4) In the workpiece changer according to (3), the loading member supporting mechanism comprises:

an arm configured to support the rotation shaft of the loading member at a distal end portion thereof; and a swing portion configured to swingably support a base end portion of the arm.

According to the workpiece changer, the arm supported by the swing portion is swung, so that the loading member supported by the distal end portion of the arm can be easily and accurately displaced to the workpiece set state and the workpiece retracted state.

(5) In the workpiece changer according to (3) or (4), when the workpiece is replaced once, a rotation amount for moving the rotation shaft in an arc is smaller than a rotation amount of the loading member about the rotation shaft.

According to the workpiece changer, the rotation amount for moving the rotation shaft is smaller than the rotation amount of the loading member about the rotation shaft during the workpiece replacement operation, so that arc drive of the rotation shaft can be at the minimum necessary rotation amount and a replacement speed of the workpiece can be increased.

In addition, drive sources such as motors can be respectively selected to be optimal.

(6) In the workpiece changer according to (4), a swing drive shaft configured to swing the arm and a rotation drive shaft configured to drive the rotation shaft of the loading member are coaxially disposed in the swing portion, and a rotation transmission member configured to transmit rotation from the rotation drive shaft to the rotation shaft of the loading member is disposed on the arm.

According to this workpiece changer, the swing drive shaft that swings the arm and the rotation drive shaft that drives the rotation shaft of the loading member are coaxially disposed, so that a size of the device can be reduced.

The arm is provided with the rotation transmission member that transmits the rotation from the rotation drive shaft to the rotation shaft of the loading member, so that a structure of the loading member supporting mechanism can be simplified and miniaturized.

Moreover, as compared with a case where a motor or the like that rotates the rotation shaft is provided at the distal end portion of the arm, a movement speed of arm can be increased by reducing weight thereof.

In addition, an electric wire such as a power supply line to a drive source or an encoder cable are not required for the arm, so that the structure can be simplified and the cost can be reduced, and reliability can be improved by eliminating a problem of disconnection due to fatigue and wear of the electric wire.

(7) In the workpiece changer according to (6), a swing motor configured to drive the swing drive shaft and a rotation motor configured to drive the rotation drive shaft are provided so as to be individually drivable.

According to the workpiece changer, the swing motor and the rotation motor are individually controlled, so that swing of the arm and rotation of the loading member can be individually controlled.

Therefore, movement of the workpiece replacement operation can be finely adjusted, and it is possible to smoothly deal with prevention of interference with the position of the shoe or the like.

(8) In the workpiece changer according to (7), the swing motor and the rotation motor are respectively provided so as to be rotatable, the swing motor and the rotation motor are configured of a biaxial integrated-type motor including an inner axis rotor and an outer axis rotor, the inner axis rotor and an outer axis rotor have a same rotation direction, one of the swing motor and the rotation motor is configured to drive the inner axis rotor, and the other of the swing motor and the rotation motor is configured to drive the outer axis rotor.

According to the workpiece changer, the biaxial integrated-type motor is used as the swing motor configured to drive the swing drive shaft and the rotation motor configured to drive the rotation drive shaft, so that the size of the device is reduced and the cost can be reduced by simplifying a structure of a power transmission member and the like.

(9) In the workpiece changer according to any one of (1) to (3), the loading member supporting mechanism comprises:

a slider configured to support the rotation shaft of the loading member; and a linear motion stage configured to support the slider so as to be linearly movable in the plane perpendicular to the axial direction of the rotation shaft According to the workpiece changer, the slider is moved in the plane perpendicular to the axial direction of the rotation shaft by the linear motion stage, so that the loading member can be easily and accurately displaced to the workpiece set state and the workpiece retracted state.

(10) In the workpiece changer according to any one of (1) to (9), the loading member supporting mechanism is configured to move the loading member, which is supported such that the rotation shaft is in a vertical direction, in a horizontal plane.

According to the workpiece changer, the vertical processing device is used, so that the flexibility in arranging a tool drive motor in an upper-lower direction is higher than in a case of the horizontal processing device, and an overall size of the device can be reduced.

The workpiece is horizontally moved to the processing position of the processing device to be replaced, which is less affected by gravity than a case of a horizontal workpiece changer that performs replacement by moving the workpiece in the upper and lower direction, and the flexibility in designing a movement path of the workpiece is increased.

(11) The workpiece changer according to any one of (1) to (10), further comprises: a pick-and-place mechanism configured to supply an unprocessed workpiece to the workpiece holding portion disposed at the replacement position of the loading member and to discharge a processed workpiece.

According to the workpiece changer, the pick-and-place mechanism is provided, so that the unprocessed workpiece can be quickly supplied to the replacement position and the processed workpiece can be quickly discharged.

In addition, the workpiece replacement operation is performed while the workpiece is being processed, tact time is not affected.

(12) A workpiece conveyance device comprises: the workpiece changer according to (11); and a workpiece conveyance unit including a workpiece supply position where the unprocessed workpiece is continuously supplied and a workpiece reception position where the processed workpiece is placed, the work conveyance unit configured to convey the workpiece, wherein the pick-and-place mechanism has a function of alternately performing: a loading operation in which the unprocessed workpiece is transferred from the workpiece supply position to the workpiece holding portion disposed at the replacement position of the loading member; and an unloading operation in which the processed workpiece held by the workpiece holding portion at the replacement position of the loading member is transferred to the workpiece reception position.

According to the workpiece conveyance device, the pick-and-place mechanism alternately performs the loading operation and the unloading operation, so that transfer of the unprocessed workpiece from the workpiece supply position to the replacement position and transfer of the processed workpiece from the replacement position to the workpiece reception position are automatically performed.

Thereby, transfer of the workpiece between the workpiece conveyance unit and the workpiece changer can be smoothly performed.

In addition, by merely changing workpiece positioning components at the workpiece supply position and the workpiece reception position in the workpiece conveyance unit, the setup-change can be easily made for changing the workpiece.

(13) A processing device configured to process the workpiece, the processing device comprising the workpiece changer according to any one of (1) to (11).

According to the processing device, since the ring-shaped workpiece can be replaced for the processing position at high speed, processing efficiency on the workpiece can be increased, and the productivity can be improved.

(14) A manufacturing method for a ring bearing, wherein the manufacturing method is for manufacturing a ring bearing by using the processing device according to (13).

(15) A manufacturing method for a machine, wherein the manufacturing method is for manufacturing a machine by using the processing device according to (13).

(16) A manufacturing method for a vehicle, wherein the manufacturing method is for manufacturing a vehicle by using the processing device according to (13).

According to the manufacturing methods for the ring bearing, the machine and the vehicle, the replacement operation of each bearing parts to the processing position can be performed easily and quickly, so that the productivity can be improved.

DESCRIPTION OF REFERENCE NUMERALS 21 loading member
23 loading member supporting mechanism
25 rotation drive unit
27 displacement drive unit
31 rotation shaft
33 workpiece holding portion
41 arm
43 swing portion
51 swing drive shaft
61 rotation drive shaft
63 rotation transmission member
65 rotation motor
75 swing motor
91 shoe
111 inner axis rotor
113 outer axis rotor
141 first linear motion stage
141a slider
141b movement rail
143 second linear motion stage
143a slider
143b movement rail
200, 200A, 200B workpiece changer
300 workpiece conveyance unit
400 pick-and-place mechanism
500 workpiece conveyance device
600 biaxial integrated-type motor
P1 processing position
P2 replacement position
P3 workpiece supply position
P4 workpiece reception position
S1 workpiece set state
S2 workpiece retracted state
W workpiece
α, β rotation amount

The invention claimed is:

1. A workpiece changer configured to replace a ring-shaped workpiece between a replacement position of the workpiece and a processing position for processing the workpiece, the workpiece changer comprising:
 a loading member rotatably supported about a rotation shaft, the loading member provided with workpiece holding portions configured to hold the workpiece at at least two radially outer edge portions;
 a loading member supporting mechanism configured to movably support the loading member in a plane perpendicular to an axial direction of the rotation shaft;
 a rotation drive unit configured to rotationally drive the loading member about the rotation shaft; and
 a displacement drive unit configured to drive and displace the loading member supporting mechanism between a workpiece set state in which the workpiece holding portions are respectively disposed at the replacement position and the processing position and a workpiece retracted state in which the workpiece holding portions are disposed away from the replacement position and the processing position,
 wherein a shoe configured to support an outer circumference of the workpiece is disposed at the processing position, and
 wherein while the loading member supporting mechanism moves the loading member from the workpiece set state to the workpiece retracted state and returns to the workpiece set state again, the displacement drive unit and the rotation drive unit perform an operation of disposing the workpiece holding portion arranged at the processing position to the replacement position and an operation of disposing the workpiece holding portion disposed at the replacement position to the processing position in a trajectory in which the loading member does not interfere with the shoe.

2. The workpiece changer according to claim 1,
 wherein the loading member is provided with the workpiece holding portions respectively at one end portion and the other end portion in a longitudinal direction at positions equidistant from the rotation shaft in a radial direction, and
 wherein positions of the workpiece holding portions are switched by reversing about the rotation shaft.

3. The workpiece changer according to claim 1,
 wherein the loading member supporting mechanism moves the rotation shaft in an arc.

4. The workpiece changer according to claim 3,
 wherein the loading member supporting mechanism comprises:
 an arm configured to support the rotation shaft of the loading member at a distal end portion thereof; and
 a swing portion configured to swingably support a base end portion of the arm.

5. The workpiece changer according to claim 3,
 wherein when the workpiece is replaced once, a rotation amount for moving the rotation shaft in the arc is smaller than a rotation amount of the loading member about the rotation shaft.

6. The workpiece changer according to claim 4,
 wherein a swing drive shaft configured to swing the arm and a rotation drive shaft configured to drive the rotation shaft of the loading member are coaxially disposed in the swing portion, and
 wherein a rotation transmission member configured to transmit rotation from the rotation drive shaft to the rotation shaft of the loading member is disposed on the arm.

7. The workpiece changer according to claim 6,
 wherein a swing motor configured to drive the swing drive shaft and a rotation motor configured to drive the rotation drive shaft are provided so as to be individually drivable.

8. The workpiece changer according to claim 7,
 wherein the swing motor and the rotation motor are respectively provided so as to be rotatable, the swing motor and the rotation motor are configured of a biaxial integrated-type motor including an inner axis rotor and an outer axis rotor, the inner axis rotor and the outer axis rotor have a same rotation direction, and
 wherein one of the swing motor and the rotation motor is configured to drive the inner axis rotor, and the other of the swing motor and the rotation motor is configured to drive the outer axis rotor.

9. The workpiece changer according to claim 1,
 wherein the loading member supporting mechanism comprises:
 a slider configured to support the rotation shaft of the loading member; and a linear motion stage configured to support the slider so as to be linearly movable in the plane perpendicular to the axial direction of the rotation shaft.

10. The workpiece changer according to claim 1, wherein the loading member supporting mechanism is configured to move the loading member, which is supported such that the rotation shaft is in a vertical direction, in a horizontal plane.

11. The workpiece changer according to claim 1, further comprises a pick-and-place mechanism configured to supply an unprocessed workpiece to the workpiece holding portion disposed at the replacement position of the loading member and to discharge a processed workpiece.

12. A workpiece conveyance device comprising:
the workpiece changer according to claim 11; and
a workpiece conveyance unit including a workpiece supply position where the unprocessed workpiece is continuously supplied and a workpiece reception position where the processed workpiece is placed, the work conveyance unit configured to convey the workpiece, wherein the pick-and-place mechanism has a function of alternately performing:
a loading operation in which the unprocessed workpiece is transferred from the workpiece supply position to the workpiece holding portion disposed at the replacement position of the loading member; and
an unloading operation in which the processed workpiece held by the workpiece holding portion at the replacement position of the loading member is transferred to the workpiece reception position.

13. A processing device configured to process the workpiece, the processing device comprising the workpiece changer according to claim 1.

14. A manufacturing method for a ring bearing, wherein the manufacturing method is for manufacturing a ring bearing by using the processing device according to claim 13.

15. A manufacturing method for a machine, wherein the manufacturing method is for manufacturing a machine by using the processing device according to claim 13.

16. A manufacturing method for a vehicle, wherein the manufacturing method is for manufacturing a vehicle by using the processing device according to claim 13.

* * * * *